United States Patent [19]

Carlisle et al.

[11] Patent Number: 4,812,009
[45] Date of Patent: Mar. 14, 1989

[54] OPTICAL FIBER CONNECTOR

[75] Inventors: Arthur W. Carlisle, Dunwoody; Bruce V. Darden, Lawrenceville; Clyde J. Myers, Stone Mountain, all of Ga.

[73] Assignee: American Telephone and Telegraph Company, AT&T Bell Laboratories, Murray Hill, N.J.

[21] Appl. No.: 68,585

[22] Filed: Jun. 30, 1987

[51] Int. Cl.$^4$ .............................................. G02B 6/38
[52] U.S. Cl. ............................... 350/96.21; 350/96.20
[58] Field of Search ............... 350/96.20, 96.21, 96.22

[56] References Cited

U.S. PATENT DOCUMENTS

| | | | |
|---|---|---|---|
| 4,422,716 | 12/1983 | Morimoto et al. | 350/96.21 |
| 4,448,478 | 5/1984 | Matthews et al. | 350/96.21 |
| 4,478,485 | 10/1984 | Khoe et al. | 350/96.20 |
| 4,553,814 | 11/1985 | Bahl et al. | 350/96.21 |
| 4,614,401 | 9/1986 | Strait | 350/96.21 |
| 4,615,581 | 10/1986 | Morimoto | 350/96.21 |
| 4,634,214 | 1/1987 | Cannon et al. | 350/96.20 |
| 4,682,848 | 7/1987 | Cairns et al. | 350/96.21 |
| 4,687,288 | 8/1987 | Margolin et al. | 350/96.20 |
| 4,690,494 | 9/1987 | Hirose et al. | 350/96.20 |
| 4,718,745 | 1/1988 | Strait | 350/96.21 |

OTHER PUBLICATIONS

N. R. Lampert application Ser. No. 068,586 filed 6/30/87, "Interconnection for Lightguide Fibers", Western Electric Engineer, Winter 1980.

*Primary Examiner*—William L. Sikes
*Assistant Examiner*—Robert E. Wise
*Attorney, Agent, or Firm*—Edward W. Somers

[57] ABSTRACT

An optical fiber connector (20) includes two plug assemblies (37—37) each including a cylindrically shaped plug (40) extending from within a cap (70). An end of each cap is adapted to be secured to a coupling housing (92) to cause the plug which extends from the cap to be received in a sleeve (105) disposed in the housing. An optical fiber cable (22) extends through a cable entrance end of the cap and has an end portion of its optical fiber terminated by the plug. An extender (85) of the cap is secured thereto and extends along the cable a distance to a location where portions (91—91) thereof are closely adjacent to the cable. Bending forces applied to the cable are transferred at the location to the extender and then to the cap. This avoids the transfer of those forces to the plug which otherwise could cause the plug to turn pivotally about an interior lip of the cap and result in an optical disconnection of the plug from the other plug in the sleeve.

29 Claims, 4 Drawing Sheets

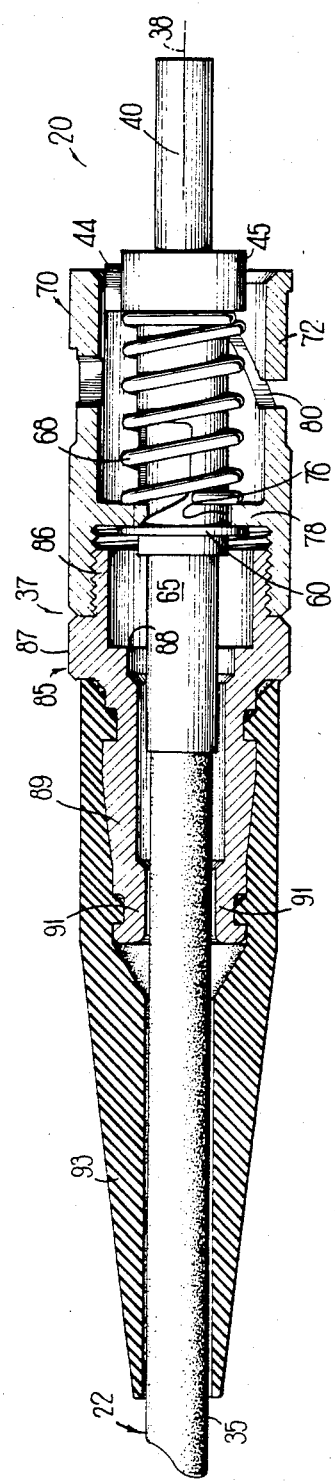
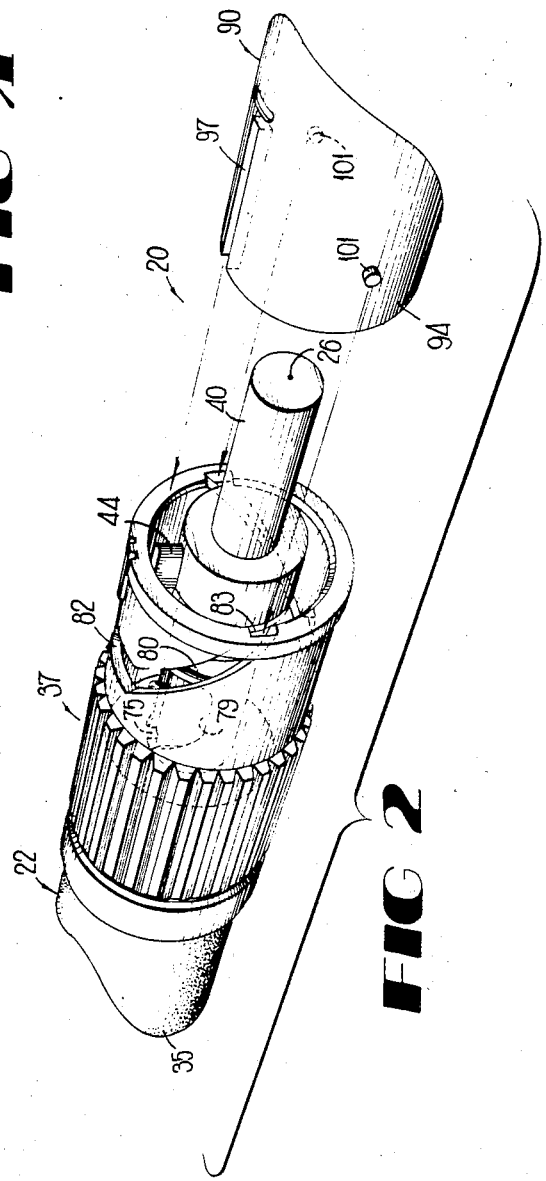

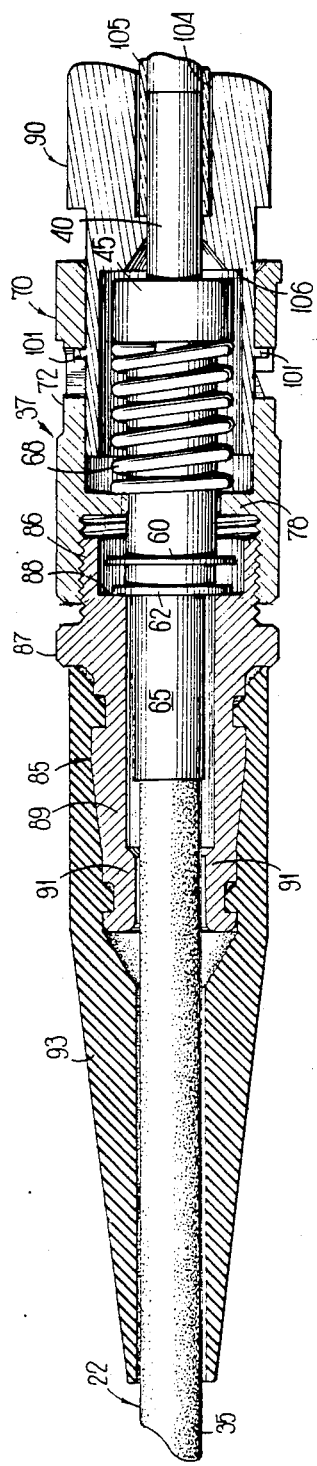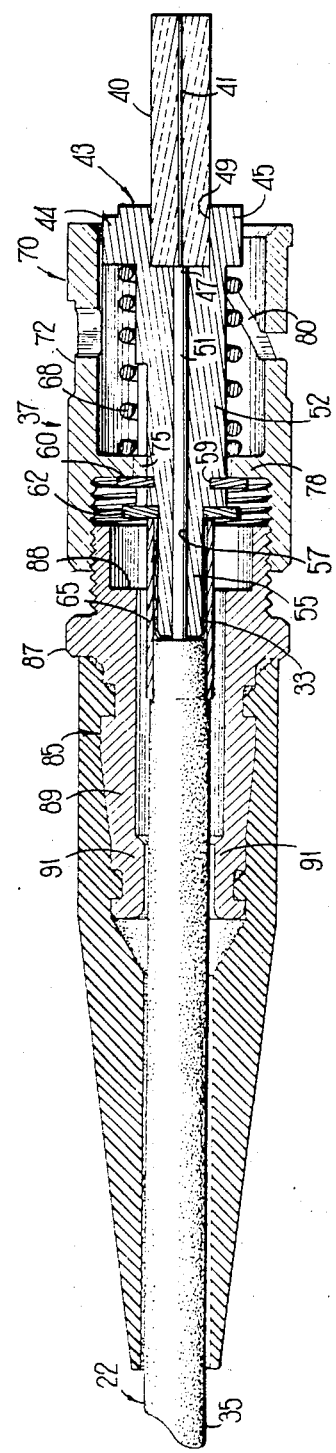

OPTICAL FIBER CONNECTOR

TECHNICAL FIELD

This invention relates to an optical fiber connector. More particularly, it relates to a connector which may be used to interconnect optical fibers or an optical fiber and an optical device and which is an ST ® connector.

BACKGROUND OF THE INVENTION

Optical fiber connectors are used to couple optically one optical fiber to another optical fiber, or optical fibers to optical devices such as LEDs, lasers or detectors. Such connectors form an essential part of substantially any optical fiber communications systems, and the industry has expended a substantial effort on their development.

An optical fiber used for communications includes a core and a cladding disposed thereabout. Considering the fact that the optical fiber may have an outer diameter of 125 microns over the cladding, the connection of two optical fibers such that their cores in the range of about 8 to 62.5 microns are aligned is a formidable task. Several connectors are available commercially for establishing a connection between optical fibers.

One connector is referred to as a biconic connector. It includes facilities for holding two plugs each of which terminates an optical fiber and each of which has a conically shaped end portion. The optical fiber end terminates in a secondary pedestal which extends beyond a primary pedestal of the plug. Two plugs are received in opposite ends of a sleeve which is mounted in a housing. The sleeve includes opposed, conically shaped cavities for receiving end portions of the plugs and for holding them in a manner to cause the end faces of the optical fibers to touch or to be spaced apart slightly. The plugs and the sleeves, which are molded, are controlled such that their mating surfaces cause the optical fibers to become aligned when the plugs are received in the sleeve.

Another connector for making an optical connection is referred to as an ST ® connector, ST being a registered trademark of AT&T. It includes a coupling having a plug-receiving tubular portion at each end thereof. Each tubular portion is provided with a longitudinally extending slot. A sleeve which floats somewhat within the coupling is adapted to receive coaxially end portions of two plug assemblies each of which includes a plug adapted to terminate an optical fiber. The plug sometimes is referred to as a terminus. Each plug has a passageway extending longitudinally therethrough for receiving an end portion of an optical fiber and is mounted in a plug body having an alignment key projecting radially therefrom. When the plug body is received in a tubular portion of the coupling, the alignment key is received in the slot which extends along the tubular portion. A retaining pin which projects radially from each tubular portion of the coupling is received in a slot of a cap which encloses the associated plug and plug body and which encloses a tubular portion of the coupling. The slot in the cap includes a portion in which the retaining pin of the coupling is received to lock the plug assembly to the coupling. The plug is biased outwardly of the cap by a compression spring disposed about the plug body.

The just-described connector is advantageous in that the plugs are made of a ceramic material and are not molded. As a result, the plugs may be machined with close tolerances which is advantageous when dealing with optical fibers having relatively small dimensions. Further, the passageways in the plugs that are destined to receive the optical fibers are made cleanly without the molding flash which may be expected in other kinds of connectors and which could damage the optical fibers. Of course, the plug may be molded, if desired.

Connectors of this type, also referred to as "ferrule-type" connectors, rely on the alignment of the outside surfaces of the plugs to provide fiber alignment. For this approach to be satisfactory, the fiber-receiving capillary bore of a plug should be concentric with the outer cylindrical surface of the plug. Furthermore, in some embodiments, the optical fiber is flush with the mating end face of the plug, and the two mating end faces in a connector are normal to the fiber axis, to within relatively close tolerances. Substantial deviations from these conditions tend to result in added signal loss.

A problem with the use of the ferrule connector relates to the potential for optical disconnection of optical fiber end faces or of an optical fiber end face and an optical device to which it is connected. It will be recalled that the plug is biased outwardly of the cap by a compression spring. Should sufficient force by applied inadvertently axially to the optical fiber cable which is terminated by the plug, in a direction away from the optical connection, the plug will be moved in a direction outwardly from the center of the sleeve causing effectively a disconnection of the optical fiber end faces or of a fiber end face and a device and hence a disconnection of optical transmission.

Also, because of the construction of the housing, the plug, upon the application of forces to the cable in a direction transversely of the axis of the connector will result in a turning of the plug about a fulcrum located between the center of the sleeve and the end of the cap. This results in a canting of the end face of the plug and angular spacing thereof from the other plug or device thereby causing an optical disconnection or increased transmission loss.

In attempting to provide a solution to the problem of unintended longitudinal and turning movement of the plug, one must be mindful of the problem of compatibility. Because many ST ® connectors already are in use, it would be imprudent to provide plug assemblies which overcome the problem of such unwanted axial or angular movement but which are not compatible with existing plugs and sleeves. A biconic connector which includes provisions for preventing inadvertent disconnection and which is compatible with other biconic connectors already in use is disclosed and claimed in commonly assigned application Ser. No. 068,586 filed of even date herewith in the name of N.R. Lampert.

A still further problem relates to the assembly of the plug assembly with the coupling housing. That assembly involves the turning of the plug assembly with respect to the housing. In many installations such as a central office, for example, the coupling is attached to a panel as one of a mass of such couplings in an array. Because of the closeness of the connector couplings in the array, it becomes somewhat difficult for a craftsman to grasp the plug assembly near its plug end to turn it into the coupling housing. The portion of the cable adjacent to the cable entrance end cannot be grasped and used to turn the plug inasmuch as the cable and plug are capable of rotating relative to the cap.

Seemingly, the prior art has not yet offered a solution to these problems. What is needed is an ST ® connector which is compatible with ST ® connector systems already in use and which includes facilities that prevent losses or inadvertent disconnection caused by bending of the cable at is entrance to the connector. Also desired is the ability to be able to turn the plug assembly for assembly to a coupling housing by turning the cable at a point remote from its entrance to the plug assembly. Further, the sought-after connector should be capable, if desired, of avoiding inadvertent disconnection upon the application of axial forces.

SUMMARY OF THE INVENTION

The foregoing problems have been solved by the optical fiber connector of this invention which may be used to connect an optical fiber to another optical fiber or to an optical device. A connector for connecting an optical fiber of an optical fiber cable to optical means comprises a plug assembly which includes an optical fiber entrance end and a connection end, a plug which is adapted to terminate an optical fiber, and a cap which is assembled to the plug. The plug assembly is adapted to be connected to optical means. Also, the connector includes a sleeve disposed in a coupling housing for receiving the plug of the plug assembly in one end thereof to cause the plug to become connected operatively to the optical means, and an extender attached to the cap at the optical fiber entrance end thereof for limiting relative angular movement between the plug and the sleeve to prevent disconnection between the optical fiber and the optical means.

The extender in a preferred embodiment is attached threadably to an end portion of the cap and extends a relatively long distance to a location remote form the cap where portions thereof are disposed closely adjacent to the optical fiber cable. Inasmuch as this location is spaced a relativley long distance from an annular inwardly projecting lip which cooperates with a retaining clip to hold the plug within the cap, the application of bending forces to the cable causes cable engaging portions of the extender to prevent pivotal movement about the lip. If this were not done, pivotal movement about the annular lip would occur and cause a disconnection of the plug from another plug within the coupling housing. In one embodiment, the extender is secured to the cap and provides sufficient rigidity of the termination adjacent to the cable entrance end to allow the cap to be turned into a coupling housing by turning the extender.

BRIEF DESCRIPTION OF THE DRAWING

Other objects and features of the present invention will be more readily understood from the following detailed description of specific embodiments thereof when read in conjunction with the accompanying drawings, in which:

FIG. 1 is a side elevational view partially in section of a plug assembly of the optical fiber connector of this invention;

FIG. 2 is a perspective view which shows a portion of the facilities of the optical fiber connector of this invention for causing a plug assembly of FIG. 1 to be secured to a coupling housing;

FIG. 3 is a detail side elevational view in section of a plug assembly of the connector of FIG. 1 which also includes provisions for avoiding optical disconnection through the application of axial as well as turning forces;

FIG. 8 is a side elevational view of the plug assembly of FIG. 7 after the plug thereof has been inserted into a coupling housing and after an extender thereof has been turned to secure the assembly to the housing.

DETAILED DESCRIPTION

Figure 9:
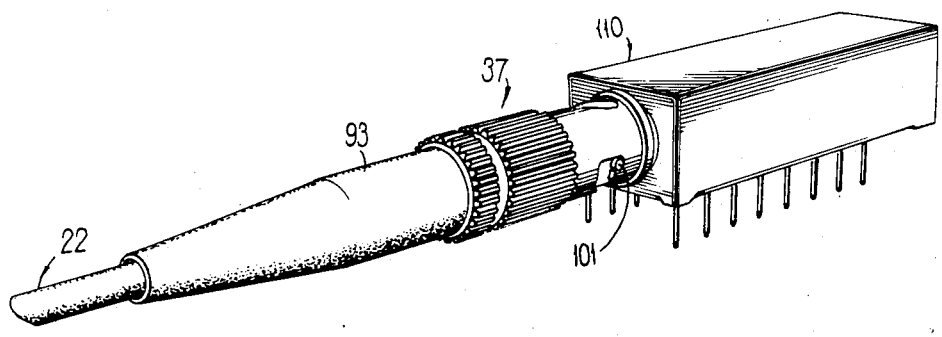
FIG. 9 is a simplified side elevational view which depicts a plug assembly connected to an optical device.

Referring now to FIGS. 1 and 2 there are shown portions of an optical fiber connector 20 for providing an optical fiber connection between optical fiber cables 22—22 or an optical fiber cable 22 and an optical device. Each optical fiber cable 22 includes a single optical fiber 26 having a core and a cladding enclosed in a coating and having a tube of polyvinyl chloride (PVC) extruded thereabout. Covering the tube of PVC is a strength member 33 (see FIG. 3) such as one made of Kevlar ® fibrous material, for example, and an outer jacket 35 which may be comprised of PVC, for example.

Referring to FIGS. 1-3, it can be seen that the connector 20 comprises an optical fiber termination or plug assembly, designated generally by the numeral 37. In order to interconnect two cables 22—22, each cable is terminated by a plug assembly 37. For two such plug assemblies 37—37, the connector 20 is such that longitudinal axes 38—38 of the plug assemblies are coaxial. In order to terminate an end portion of an optical fiber 26, each plug assembly 37 comprises an optical fiber terminus or plug 40, having a passageway 41 (see FIG. 3) and being made of a ceramic material. Although the plug 40 is made preferably of ceramic material, it could also be made of drawn glass, machined or die-cast metal, metal with a ceramic or plastic insert, transfer molded plastic or injection molded plastic.

The coating, as well as the PVC tube, strength member 33 and outer jacket 35, is removed from an end portion of an optical fiber 26 prior to its termination with a plug 40. Then the end portion of the optical fiber 26 is inserted into the passageway 41 of a plug such that the end face of the optical fiber extends slightly beyond the end face of the plug. The bared optical fiber has an outer diameter of 125 microns whereas the diameter of the passageway 41 is about 127 microns. Then the end portion of the optical fiber 26 is secured within the passageway 41 of the plug 40 and the end faces of the optical fiber and of the plug are ground and polished.

The plug assembly 37 (see FIGS. 1-3) also includes a plug body in the form of a barrel 43 which has a cylindrical cross section and which has an enlarged end portion 45. The enlarged end portion includes a key 44 which projects radially therefrom. The barrel 43 which includes a stepped bore 47 includes an enlarge portion 49 for receiving an end portion of the plug 40 and a smaller portion 51 which extends through a small diameter portion 52 of the barrel. The bore 47 is disposed concentrically about the longitudinal axis 38 of the plug assembly 37. Attached to the barrel 43 is an extension 55 having a passageway 57 therethrough which is aligned with the stepped bore 47 in the barrel. A can be seen, the diameter of the extension 55 is less than that of the small diameter portion of the barrel 43. An end portion of the barrel 43 adjacent to the extension is provided with a groove 59 for receiving a retaining clip 60.

Figure 6:
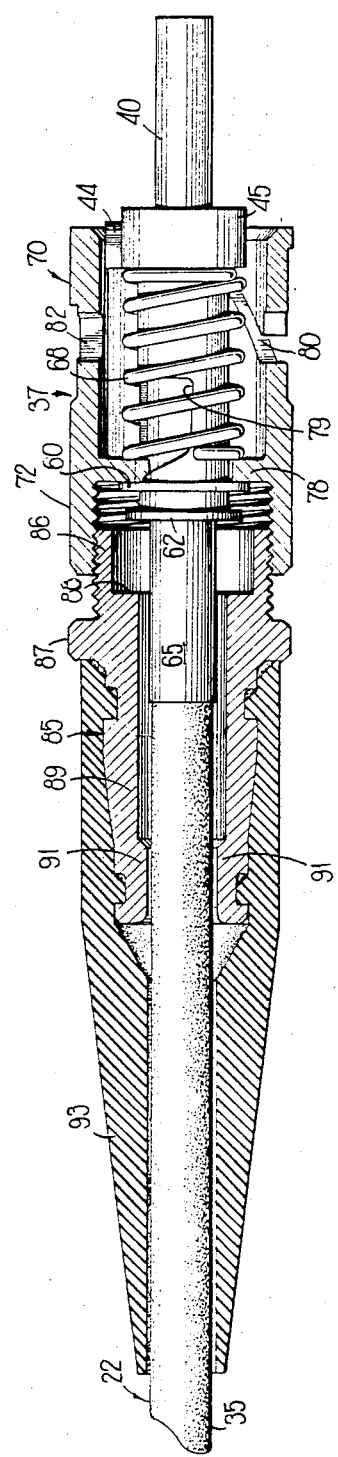
FIG. 6 is a side elevational view partially in section which shows a plug assembly which includes provisions for avoiding inadvertent disconnection through the application of axial as well as turning forces.
Figure 7:
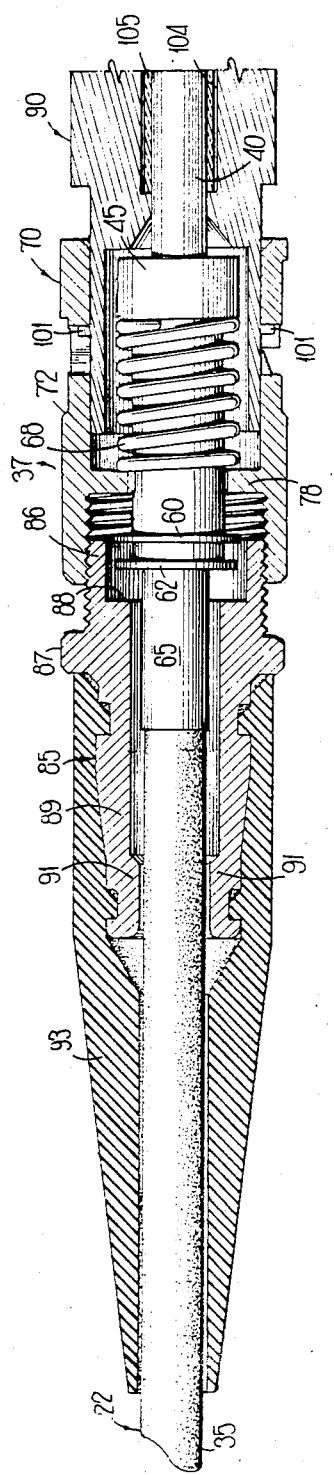
FIG. 7 is a side elevational view which show the plug assembly of FIG. 6 rotated through an angle of 90° from the position shown in FIG. 6 and assembled to a coupling housing.

In one embodiment (see FIG. 3 and also FIGS. 6–8), a retaining washer 62 is disposed about the extension 55 and engages a shoulder formed by the end of the small diameter portion 52 of the barrel 43. The optical fiber cable from which the optical fiber extends into the passageway 57 and bore 47 abuts the end of the extension 55. A sleeve 65 is disposed about an end portion of the cable 22 and an end portion of the extension 55 and is crimped thereabout. Portions of the yarn-like strength member 33 of the cable may extend forward of the end of the cable 22 and be crimped between the sleeve 65 and the outer surface of the extension 55.

Also, each plug assembly includes a cap 70 comprising a tubular housing 72 made of a metallic or plastic material. It should be noted that the plug 40, the barrel 43 and the housing 72 each have a cylindrical crosssection.

The small diameter portion 52 of the barrel 43 (see FIG. 3) extends through an opening 76 in an internally disposed lip 78 in the housing of the cap. The retaining clip 60 circumscribes the barrel 43 on the outer, cable entrance side of the lip 78. Each plug assembly 37 also includes a compression spring 68 which is disposed about the smaller diameter portion 52 of the barrel 43 between and in engagement with the lip 78 and the enlarged end portion 45 of the barrel. As a result of this arrangement, the spring 68 biases the barrel 43 outwardly from the cap 70 and the retaining clip holds the connector body within the housing 72.

It should also be observed from FIG. 3 that the annular lip 78 includes a stud 75 which extends into a camming groove 79 (see FIG. 2) in the barrel 43. The camming groove is configured to have a width substantially equal to the width of the stud 75 at its inner end. From there, the groove transitions abruptly along a sloping portion into a portion having a width which approaches half the circumference of the small diameter portion 52 of the barrel 43. This allows the cap 70 to be turned relative to the plug 40. The stud 75 is arranged with respect to the cap so that when it is bottomed out at the innermost end of the camming groove 79, the stud is aligned longitudinally with the key 44.

Viewing again FIGS. 1–2, it can be seen that the cap housing 72 includes circumferentially longitudinally extending opposed camming slots 80—80 each of which at its inner end communicates with a relatively short longitudinally extending slot 82. Each of the slots 80—80 extends in a helical manner from a plug end of the cap 70 toward the cable entrance end of the cap. These slots are used for securing a plug assembly 37 to another portion of the connector 20.

The cap 70 includes two keyways 83—83 (see FIG. 2) which are diametrically opposed to each other. Each keyway 83 extends from a peripheral end face of the plug end of the cap to an associated camming slot 80 to which it opens. When the stud 75 of the annular lip 78 is bottomed out in the camming groove 79 and aligned with the key 44, the diametrically opposed keyways 83—83 are each displaced 90° from the key. The stud 75 serves to maintain the 90° spacing between the key and each keyway with the key 44 aligned with the stud and prevents unwanted misorientation.

Each plug assembly 37 also includes means for preventing inadvertent angular movement of the plug 40 and for facilitating the turning of the cap by applying turning forces at a location remote from the cap. A cap extender 85 (see FIG. 1) having an externally threaded portion 86 is turned into the threaded entrance end of the cap and secured thereto. In the embodiment of FIG. 1, the extender 85 is bonded to the cap 70 after it has been turned fully thereinto. The extender includes a boss 87 which abuts the cap in the embodiment shown in FIG. 1 and an internally disposed shoulder 88. A tubular portion 89 extends from the boss 87 to inwardly directed, opposing cable-engaging portions 91—91.

Completing the plug assembly, there is shown a portion 93 which extends from the boss 87 of the extender 85 along the optical fiber cable in a conically shaped configuration until it assumes the general cross-section of the cable. This portion of the connector 20 provides strain relief for the termination and insures that the cable can withstand repeated bends in use after interconnection with another cable without undue stresses being imparted to the optical fibers.

Figure 4:
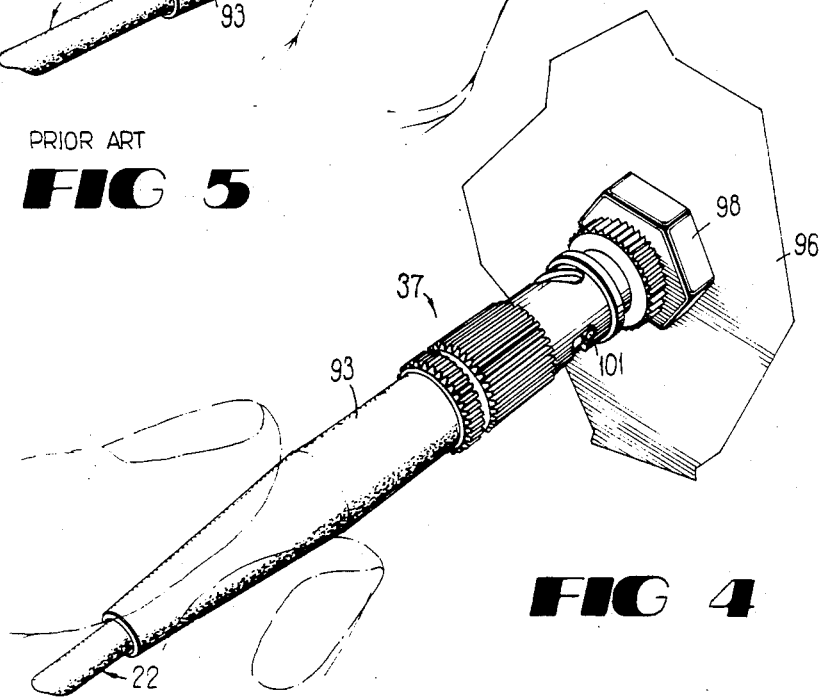
FIG. 4 is perspective view which shows the turning of the plug assembly to secure it to a coupling by grasping a cable terminated by the plug assembly at a location remote from a cap of the plug assembly.

Each of the barrels 43—43 and plugs 40—40 is adapted to be received in a coupling designated generally by the numeral 90 (see FIGS. 1 and 2). The coupling 90 includes a tubular housing 92 having end portions 94—94 with each end portion including a longitudinally extending slot 97. In order to allow the connector 20 to be panel-mountable, the coupling 90 may include a center portion which is threaded and which is adapted to be inserted into an opening in a panel 96 (see FIG. 4). A fastening device 98 is turned thereonto to secure the coupling to the panel. Also included in the coupling 90 at each end portion 94 and 96 thereof are retaining pins 101—101 (see FIG. 2) each of which is displaced 90° circumferentially from the slot 97 at that end.

In assembling the connector 20, an installer panel-mounts the coupling 90 or otherwise positions it to receive the plug assemblies. Each plug assembly is that shown in FIG. 1. Mounted within a cavity 104 of the coupling 90 is a sleeve 105 (see FIGS. 2 and 7). Each end portion of the sleeve 105 is as shown in FIG. 2. Also, the sleeve 105 is adapted to receive two of the plugs 40—40 of the plug assemblies and is a means for aligning the outer surfaces of the plugs. The sleeve 105 is disposed within the coupling 90 such that it floats somewhat therein to allow for some movement of the plugs 40—40 when they are inserted into the coupling. Further, the sleeve 105 causes the longitudinal axes 38—38 of the plugs 40—40 mounted therein to be coaxial.

The installer, in assembling the connector 20, inserts the plug 40 of one of the plug assemblies into the sleeve 105 with the pins 101—101 of the coupling being received in the keyways 83—83 which communicate with the slots 80—80 of the cap 70. At the same time, the installer has caused the key 44 which extends radially from the enlarge portion 45 of the barrel 43 of the one plug assembly to be received in a longitudinal slot 97 of the coupling 90. Then the installer moves the plug 40 farther into the sleeve with the pins 101—101 of the coupling camming the walls of the slot 80—80 and causing the cap 70 to turn relative to the plug. The movement of the plug 40 is discontinued when the enlarged portion 45 engages an abutment 106 of the coupling housing. Continued movement of the cap against the bias of the spring 68 compresses the spring and causes the cap housing to override the barrel. When the pins 101—101 at the one end of the coupling 90 reach inner end of the slots 80—80, the installer releases the cap housing to allow the spring to cause relative motion between the cap and the coupling to cause the pins 101—101 to become disposed and secured within the slots 82—82 (see FIG. 4). It should be observed that with an intentional turning movement, the stud 75 overrides the camming groove 79 and the cap housing 72 is free to turn about the plug 40 and its associated plug body 43. This allows the cap housing 72 to be turned independently of the barrel 43 to cause the pins 101—101 to become disposed within the latching portions 82—82. Also, it should be noted that at this time, the end face of the first plug 40 to be inserted into coupling 90 extends past the center-line of the sleeve 105.

After these steps, the installer repeats the procedure with respect to the other plug assembly to cause the plug 40 thereof to be received within the floating sleeve 105. When the other plug is inserted, its movement is discontinued when it engages the plug already in the sleeve 105. It should be observed that because of dual pins at each end of the coupling 90, either end may be inserted into a panel. The geometries of the coupling 90 and of the plug assemblies are such that when the plugs 40—40 are received within the floating sleeve 105, and the plug 40 of the second plug assembly engages the plug 40, the first plug to be inserted, the end of the second plug causes the end face of the first plug to be moved rearwardly toward its cap 70 and both end faces assume their final desired positions at the centerline of the sleeve 105 so that the end faces of the plugs 40—40 abut each other. As a result, transmission losses through the connector 20 are minimized.

The plug assembly 37 of this invention overcomes the problems described in the Background of the Invention hereinbefore. First, because of the engagement of the portions 91—91 of the extender 85 at a location remote from the annular lip 78, the application of bending forces to the cable 22 will result in the cable being engaged with those portions prior to engagement of the plug body with the lip 78. In other words, bending forces applied to the cable 22 are transferred to the cap instead of to the plug 40. Consequently, the plug body does not move pivotally about the lip and angular movement of the plug end faces is avoided thereby preventing optical disconnection caused by angular displacement.

Figure 5:
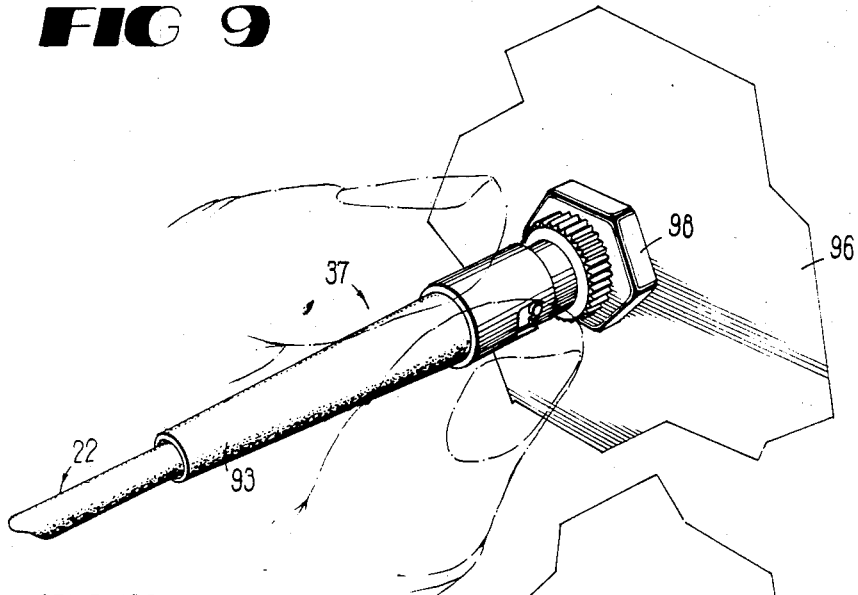
FIG. 5 is a perspective view which shows how a prior art connector must be grasped to cause the plug assembly thereof to be secured to a coupling.

Secondly, the cap extender 85 reinforces the cable end strain relief member 93 adjacent to the cable entrance end. This arrangement provides a somewhat rigid portion so that the installer can grasp the strain relief member 93 or cable in the vicinity of the extender (see FIG. 4) and apply turning forces to turn the cap and cause it to become secured to the coupling housing. A will be recalled from the Background of the Invention, in a prior art arrangement (see FIG. 5), the installer nut grasp the cap because of the relative flexibility of the cable at the entrance end to the cap.

Accordingly, the connector arrangement just described overcomes the problem of connectorization in closely spaced arrays. Because the cap extender is bonded to the cap 70. turning of the strain relief portion of the cab 22 which is fitted tightly over the extender results in a turning of the cap. Consequently, in closely spaced arrays of the couplings in a panel, for example, plug assemblies can be turned into the couplings by grasping and turning the strain relief portions of the cable (see FIG. 4) thereby avoiding problems in trying to grasp the caps in congested termination areas.

It should be observed from the drawings that in another embodiment, the plug assembly includes provisions for limiting axial movement of the plug as well as preventing any pivotal movement thereof. In this embodiment, the end retaining ring 62 is disposed about the barrel extension 55 and held in engagement with the end of the small diameter portion 52 of the barrel 43 by the crimping sleeve 65 which is crimped about the cable and the barrel extension as shown in FIGS. 3 and 6-8. In this embodiment, the extender is not bonded or otherwise fixedly secured to the cap.

In order to assemble the plug assembly 37 of this embodiment with a coupling 90, the installer turns out the threaded end portion 86 of the extender 85 from the cable entrance end of the cap 70. (see FIG. 6). After the entrance keyways 83—83 to the camming slots 80—80 are aligned with the radially projecting pins 101—101 of the coupling housing 90 and the key 44 with a slot 97 in the housing, the installer moves the plug assembly toward the center of the coupling housing by grasping the strain relief portion 93 or the cap 70 of the plug assembly and applying longitudinal and then turning forces. This causes the cap to turn rotably as the pins 101—101 cam the cap as they ride along the slots 80—80. This occurs until the enlarged portion 45 of the barrel 43 engages the abutment 106 of the coupling 90 (see FIG. 7) at which time the pins 101—101 of the coupling are disposed at inner end of the slots 80—80. The installer releases the plug assembly which allows the spring 68 to seat the pins 101—101 in the slots 82—82. Then the installer turns the threaded portion 86 of the cap extender 85 back into the threaded end of the cap which causes the end retaining ring 62 to become disposed in engagement with the shoulder 88 of the extender (see FIG. 8). This prevents axial movement of the plug upon the application of the axial forces to the optical fiber cable 22. In some instances, the plug assembly 37 may be arranged so that after assembly to the coupling 90, the retaining ring 62 is spaced a predetermined distance from the shoulder 88. The distance is less than that through which the plugs 40—40 in the sleeve 105 may move without optical disconnection occuring. A can be observed in FIG. 8, the boss 87 of the extender is spaced slightly from the cap after the extender has been turned freely into the cap. what is important is that the retaining ring is spaced a distance from the shoulder 88 which as been predetermined to be insufficient to result in optical disconnection between the optical fibers should the plug be moved through that distance.

It is important in this embodiment to recognize that the extender can move rotatably relative to the cap until after the cap has been secured to the coupling and the extender turned in to the cap. As a result, in order to secure the cap to the ocupling, it becomes necessary to grasp the cap and to turn it into the coupling. If the extender 85 were turned into the cap until the boss abutted the cap 70, the cap could not be seated fully in the coupling housing 92. The reason for this is that in order to seat fully the cap in the coupling housing, the pins 101—101 of the coupling housing must override their final positions in the slots 82—82 in order to be moved around the ends of the slots 80—80 and into those final positions. If the extender 85 were turned all the way into the cap 70, the retaining ring 62 would engage the shoulder of the extender before the pins have an opportunity to override their final positions thereby preventing the full seating of the cap in the coupling housing.

Other arrangements of an optical fiber connector which includes the plug assembly 37 may be used. For example, in FIG. 9, there is shown a plug assembly 37 which is connected to an optical fiber device 110.

It is to be understood that the above-described arrangements are simply illustrative of the invention. Other arrangements may be devised by those skilled in the art which will embody the principles of the invention and fall within the spirit and scope thereof.

What is claimed is:

1. An optical fiber connector for connecting an optical fiber of an optical fiber cable to optical means, said connector comprising:

a plug assembly which includes an entrance end for an optical fiber cable comprising an optical fiber and a connection end, a plug adapted to terminate an optical fiber, a cap which is assembled to said plug, and resilient means for urging said plug outwardly of said cap in a direction away from said optical fiber entrance end, said plug assembly adapted to be connected to optical means at said connection end;

sleeve means for receiving said plug of said plug assembly in one end thereof and an optical means disposed adjacent to said plug to cause the optical fiber terminated by said plug to become connected operatively to the optical means; and extender means attached to said plug assembly at the optical fiber cable entrance end for transferring bending forces applied to the optical fiber cable adjacent to the optical fiber cable entrance end to said cap instead of to said plug thereby limiting relative angular movement between said plug and the optical means to prevent optical disconnection therebetween.

2. The optical fiber connector of claim 1, wherein said plug assembly also includes a barrel for holding said plug, said barrel including a portion to which is secured an end of the optical fiber cable, said connector further including a retaining ring which is fixedly attached to a portion of said barrel and which when the optical fiber of said plug is operatively connected to the optical means is a predetermined distance from a portion of said extender so that upon the application of axial forces to the cable any movement of said plug is insufficient to result in optical disconnection of the optical fiber from the optical means.

3. The optical fiber connector of claim 2, wherein said extender means extends from said cable entrance end outwardly from said cap to a location remote from said cap and includes portions which are adapted to engage the cable so that bending forces applied to the cable are transferred through said portions and said extender means to said cap and to a coupling in which is disposed said sleeve means.

4. An optical fiber connector for connecting one optical fiber to another optical fiber, said connector comprising:

first and second plug assemblies each of which includes a cylindrically shaped plug having a passageway therethrough and being adapted to terminate an optical fiber disposed in said passageway and a cap which encloses a portion of said plug, each of said plug assemblies including means for causing the said plug thereof to be biased outwardly in a direction from a cable entrance end to the other end thereof;

coupling means including a housing and a sleeve for receiving end portions of the plug of each of said plug assemblies to hold said end portions in said sleeve in alignment with each other, each of said caps being adapted to be secured to an end of said housing of said coupling means; and extender means connected to a cable entrance end of each of said caps and extending along a cable which includes an optical fiber to be terminated by the plug associated therewith for engaging the cable at a location remote from said cap at least under the application of lateral forces to said cable to transfer said forces to said cap and said coupling housing to prevent said plug from turning about its longitudinal axis thereby avoiding unwanted optical losses in transmission between the optical fibers.

5. The optical fiber connector of claim 4, wherein each of said caps includes an annular inwardly projecting lip through which a barrel in which is disposed an end portion of said plug extends, said barrel having an enlarged end portion in which is disposed said end portion of said plug, said plug assembly also including a retaining clip which is disposed about said barrel adjacent to an inner side of said lip and a compression spring disposed about said barrel and engaging an outer side of said lip and an inner side of said enlarged portion of said barrel to urge said barrel and plug outwardly with said retaining clip holding said plug in said cap, said barrel also including a key which projects radially from and is attached to said enlarged portion thereof.

6. The optical fiber connector of claim 5, wherein said cap also includes a stud which projects inwardly from said lip, said stud being received in a camming race provided in said barrel such that when said stud is disposed at an inner end of said race, inadvertent rotary relative motion between said barrel and said cap is prevented.

7. The optical fiber connector of claim 6, wherein said cap includes two diametrically opposed camming slots each of which extends from a coupling end of said cap inwardly helically about said cap, each of said camming slots communicating with an associated locking slot which extends from an inner end of the associated camming slot outwardly in a direction parallel to a longitudinal axis of said plug, each said cap also being provided with diametrically opposed keyways, each said keyway at a coupling end of said cap communicating with an outer end of an associated camming slot, said coupling housing including a longitudinally extending slot which extends from an entrance end of said housing and a pair of diametrically opposed pins projecting outwardly from said housing, said pins and slot being such that when a cap of a plug assembly is aligned with said coupling such that the key of said plug is aligned with a slot in an end of said housing, said pins of said coupling housing are aligned with said keyways of said cap and adapted to be moved along said keyways and into said camming slots to allow said plug assembly to be secured to said coupling.

8. The optical fiber connector of claim 7, wherein said extender means is such that it includes outer end portions which are directed inwardly into proximity with a cable which the associated plug terminates, the arrangement being such that upon the application of transverse forces to the cable, the cable is engaged by the inwardly directed portions of said extender means to prevent turning movement of said barrel of said plug assembly about said annular lip of said cap.

9. The optical fiber connector of claim 8, wherein said extender means includes an end which is fixedly attached to a cable entrance end of said cap.

10. The optical fiber connector of claim 8, wherein an inner end of said extender means is threaded externally and the cable entrance end of said cap is threaded internally to receive said externally threaded end of said extender means, and wherein said plug assembly includes a barrel extension which is attached to said barrel and which has a diameter smaller in diameter than said barrel, and an end retaining ring which is disposed about said barrel extension and being in engagement with an end of said barrel, said retaining ring adapted to be held in engagement with said barrel by a crimping sleeve which is adapted to be in secured engagement with said barrel extension and with an end portion of the cable, said retaining ring adapted to be disposed a predetermined distance from a shoulder of said extender means when said plug assembly is assembled to said coupling means such that upon the application of axial forces to the cable, said plug thereof is moved rearwardly in said sleeve allowing the other plug to be biased toward and in continued engagement with it until said retaining ring engages said shoulder, the distance which the plug moves being the predetermined distance which is less than that required to cause optical disconnection between the plugs.

11. The optical fiber connector of claim 8, wherein said connector is adapted to terminate an optical fiber cable which includes an optical fiber, said cable extending into said extender means and the optical fiber extending into an extension of the barrel, with an end portion of the cable and an end portion of the barrel extension being received in a crimping sleeve which holds the cable to the barrel extension, said extender means being sufficiently rigid to transfer turning forces which are applied to the extender means between its inner and outer ends to said cap.

12. An optical fiber connector for connecting one optical fiber to another optical fiber, said connector comprising:
first and second terminated optical fibers each including:
a plug assembly which includes a cylindrically shaped plug having a passageway therethrough and a cap which encloses a portion of said plug, each of said plug assemblies including means for causing said plug thereof to be biased outwardly in a direction from a cable entrance end to the other end thereof; and
an optical fiber cable which includes an optical fiber having an end portion disposed in said passageway of said plug;
coupling means including a housing and a sleeve for receiving an end portion of the plug of each of said plug assemblies to hold said end portions in said sleeve in alignment with each other, each of said caps being adapted to be secured to an end of said housing of said coupling means; and
cap extender means connected to a cable entrance end of each of said caps and extending along the cable terminated by the plug associated therewith for engaging the cable at a location remote from said cap at least under the application of lateral forces to the cable to transfer the forces to the associated cap and coupling housing to prevent said plug from turning about its longitudinal axis thereby avoiding unwanted optical losses in transmission between the optical fibers.

13. The optical fiber connector of claim 12, wherein each of said caps includes an annular inwardly projecting lip through which a barrel in which is disposed an end portion of a plug extends, said barrel having an enlarged end portion, said plug assembly also including a retaining clip which is disposed about said barrel adjacent to an inner side of said lip and a compression spring disposed about said barrel and engaging an outer side of said lip and an inner side of said enlarged portion of said barrel to urge said barrel and plug outwardly, said retaining clip being effective to hold said plug in said cap.

14. The optical fiber connector of claim 13, wherein said barrel also includes a key which projects radially from and is attached to said enlarged portion thereof.

15. The optical fiber connector of claim 14, wherein said cap also includes a stud which projects inwardly from said lip, said stud being received in a camming race provided in said barrel such that when said stud is disposed at an inner end of said race, inadvertent rotary relative motion between said barrel and said cap is prevented.

16. The optical fiber connector of claim 15, wherein said cap includes two diametrically opposed camming slots each of which extends from a coupling end of said cap inwardly helically about said cap to a location adjacent to said lip, each of said camming slots communicating with a locking slot which extends from an inner end of the associated camming slot outwardly in a direction parallel to a longitudinal axis of said plug, each said cap also being provided with diametrically opposed keyways, each said keyway at a coupling end of said cap communicating with an outer end of an associated camming slot, said coupling housing including a longitudinally extending slot which extends from an entrance end of said housing and a pair of diametrically opposed pins projecting outwardly from said housing, said pins and slot of said housing being such that when a cap is aligned with said coupling such that the key of said plug assembly is aligned with said slot in an end of said housing, said pins of said coupling housing are aligned with said keyways of said cap and adapted to be moved along said keyways and into said camming slots to secure said plug assembly to said coupling housing.

17. The optical fiber connector of claim 16, wherein said extender means is such that it includes end portions which are disposed remotely from said cap and which are directed inwardly into proximity with the cable which the associated plug terminates, the arrangement being such that upon the application of transverse forces to the cable, the cable is engaged by the inwardly directed portions of said cap extender means to prevent turning movement of said barrel of said plug assembly about said annular lip of said 18. The optical fiber connector of claim 17, wherein an inner end of said cap extender means is threaded externally and the cable entrance end of said cap is threaded internally to receive said externally threaded end of said cap extender means.

19. The optical fiber connector of claim 18, wherein said plug assembly includes a barrel extension which is attached to said barrel and which has a diameter smaller in diameter than said barrel, and an end retaining ring which is disposed about said barrel extension and being in engagement with an end of said barrel extension, said retaining ring being held in engagement with said barrel extension by a crimping sleeve which is in secured engagment with said barrel extension and with an end portion of the cable, said retaining ring being disposed a predetermined distance from a shoulder of said cap extender means when said plug assembly is assembled to said coupling housing such that upon the application of axial forces to the cable, said plug thereof is moved rearwardly in said sleeve allowing the other plug in said sleeve to be biased toward and in continued engagement with it until said retaining ring engages said shoulder, the distance which the plug moves being the predetermined distance which is less than that required to cause optical disconnection between the optical fibers terminated by the plugs.

20. An optical fiber connector plug assembly, which comprises:
   a plug having a cylindrical cross section and a passageway therethrough for receiving an optical fiber of an optical fiber cable, said plug being adapted to be received in a sleeve which is adapted to receive optical means to allow an optical connection to be made between the optical fiber received in the plug and the optical means;
   a barrel for holding coaxially an end portion of said plug, said barrel including a passageway which is aligned with said passageway of said plug;
   a cap which encloses a portion of said barrel and from which extends said plug for receipt in a sleeve, said cap including means for causing said cap to be secured to a housing which holds the sleeve;
   resilient means for causing said plug to be biased outwardly of said cap in a direction from a cable entrance end of the cap to a connection end thereof; and
   extender means attached at one end to said cap at the cable entrance end of said cap at the other end being in proximity with the cable for transferring bending forces applied to the cable terminated by the plug to said cap to prevent transfer of the forces to said plug.

21. The plug assembly of claim 20, wherein said cap includes an annular inwardly projecting lip through which a barrel in which is disposed an end portion of said plug extends, said barrel having an enlarged end portion, said plug assembly also including a retaining clip which is disposed about said barrel adjacent to an inner side of said lip and wherein said resilient means includes a compression spring disposed about said barrel and engaging an outer side of said lip and an inner side of said enlarged portion of said barrel to urge said barrel and plug outwardly.

22. The plug assembly of claim 21, wherein said barrel also includes a key which project radially from and is attached to said enlarged portion thereof.

23. The plug assembly of claim 22, wherein said cap also includes a stud which projects inwardly from said lip, said stud being received in a camming race provided in said barrel such that when said stud is disposed at an inner end of said race, inadvertent rotary relative motion between said barrel and said cap is prevented.

24. The plug assembly of claim 23, wherein said plug assembly is adapted to be secured to a coupling which includes a housing in which is disposed the sleeve, and wherein said cap incudes two diametrically opposed camming slots each of which extends from a coupling end of said cap inwardly helically about said cap, each of said camming slots communication with a locking slot which extends from an inner end of the associated camming as lot outwardly in a direction parallel to a longitudinal axis of said plug, each said cap also being provided with diametrically opposed keyways, each said keyway at a coupling end of said cap communicating with an outer end of an associated camming slot, the coupling housing including a longitudinally extending slot which extends from an entrance end of the housing and a pair of diametrically opposed pins projecting outwardly of said housing, the pins and slot being such that when a cap is aligned with the coupling such that the key of said plug is aligned with the slot in an end of said housing, the pins of the coupling housing are aligned with said keyways of said cap and adapted to be moved along said keyways and into said camming slots.

25. The plug assembly of claim 24, wherein said extender means is such that it includes outer end portions which are directed inwardly into proximity with the cable which the associated plug terminates, the arrangement being such that upon the application of transverse forces to the cable, the cable is engage by the inwardly directed portions of said extender means to prevent turning movement of said barrel of said plug assembly about said annular lip of said cap.

26. The plug assembly of claim 25, wherein said extender means includes an end which is adapted to be bonded to a cable entrance end of said cap.

27. The plug assembly of claim 25, wherein an inner end of said extender means is threaded externally and the cable entrance end of said cap is threaded internally to receive said externally threaded end of said extender.

28. The plug assembly of claim 23, wherein said plug assembly includes a barrel extension which is attached to said barrel and which has a diameter smaller in diameter than said barrel, and an end retaining ring which is adapted to be disposed about said barrel extension and in engagement with an end portion of said barrel, said retaining ring held in engagement with said barrel by a crimping sleeve which is adapted to be in secured engagement with said barrel extension and with an end portion of the cable, said retaining ring being disposed in engagement with a shoulder of said extender means when said plug assembly is assembled to a coupling to prevent movement of said plug upon the application of axial forces to the cable.

29. An optical fiber connection, which comprises:
   a coupling housing which includes a pair of pins projecting radially from each end;
   a sleeve which is disposed within said housing;
   first and second terminated optical fiber cables, each comprising:
      an optical fiber cable which includes an optical fiber;
      first and second plug assemblies each of which includes:
         a cylindrically shaped plug having a passageway therethrough for holding an optical fiber end portion of the cable, each said plug being disposed in said sleeve such that the optical fiber end portion in one of said plugs is connected optically to the optical fiber end portion in the other one of said plugs;

a barrel having an enlarged portion at one end thereof with a key extending radially therefrom and a stepped passageway therethrough, an enlarged portion of said passageway being disposed in said enlarged portion of said barrel for receiving an end portion of said plug, said barrel including a circumferential groove and a circumferential camming groove adjacent to an opposite end thereof;

a barrel extension being attached to said barrel at said opposite end and having a diameter less than the diameter of said barrel;

a retaining ring which is disposed about said barrel extension and which is in engagment with a peripheral end portion of said barrel;

a retaining clip which is disposed in said circumferential groove;

a compression spring which is disposed about said barrel;

a crimping sleeve which is crimped over an end portion of a cable terminated by the plug assembly and over an end portion of said barrel extension in a manner to hold said retaining ring in engagement with the peripheral end portion of the barrel;

a cap including an inwardly threaded cable entrance end and a connection end from which protrudes said plug, said cap including an annular, inwardly projecting lip having an inwardly projecting stud with said spring being inengagment with one side thereof and with said enlarged portion of said barrel and said retaining clip in engagement with the other side thereof, said cap being secured to said coupling housing and said stud of said lip being disposed at an inner end of said camming groove of said barrel to cause said key to be disposed centrally between two opposed keyway slots at said connection end of s aid cap to facilitate assembly of said plug assembly to said coupling housing, each of said keyways communicating with a helically extending slot and locking slot connected thereto, each of said pins of said coupling being disposed in one of said locking slots; and a cap extender having a threaded end turned into said threaded end of said cap and having inwardly directed portions remotely disposed from said threaded portion and being in proximity with said cable, said cap extender being sufficiently rigid and said portions being disposed sufficiently far from said cap so that upon the application of transverse forces to said cable adjacent to said cable entrance end of said cap, said forces are transferred to said cap and thence to said coupling housing thereby causing any turning of said plugs to be an amount which is insufficient to cause optical disconnection across the plug ends.

* * * * *